A. A. WESTER.
TOY VEHICLE.
APPLICATION FILED APR. 29, 1920.

1,378,434.

Patented May 17, 1921.

A. A. Wester, INVENTOR.

BY
Lacy & Lacy,
ATTORNEYS.

UNITED STATES PATENT OFFICE.

ARTHUR A. WESTER, OF BOONE, IOWA.

TOY VEHICLE.

1,378,434.  Specification of Letters Patent.  Patented May 17, 1921.

Application filed April 29, 1920. Serial No. 377,692.

*To all whom it may concern:*

Be it known that I, ARTHUR A. WESTER, a citizen of the United States, residing at Boone, in the county of Boone and State of Iowa, have invented certain new and useful Improvements in Toy Vehicles, of which the following is a specification.

This invention relates to a toy vehicle which may be so constructed as to simulate, in appearance and action, the movement of a trotting or a cantering horse.

The invention has, as one object thereof, the provision of a vehicle of the above mentioned character which is passenger propelled either by the occupant thereof imparting motion through walking movements of the feet on the ground or by teetering motions of one or more passengers.

The invention has as a further object the provision of a running gear having axles carrying wheels, a passenger-carrying body pivotally carried above said running gear at substantially the transverse portion with means connecting one of the axles with the passenger carrying body in such manner that propulsion of the vehicle imparts an oscillatory motion to the passenger carrying body thereby simulating the movement of a horse or other animal.

Another object of the invention is the provision of a running gear having a passenger carrying body mounted thereabove and wherein the running gear exceeds in lateral dimensions the width of the passenger carrying body with the passenger thereon whereby the lateral stability of the vehicle is greatly increased.

Figure 1:
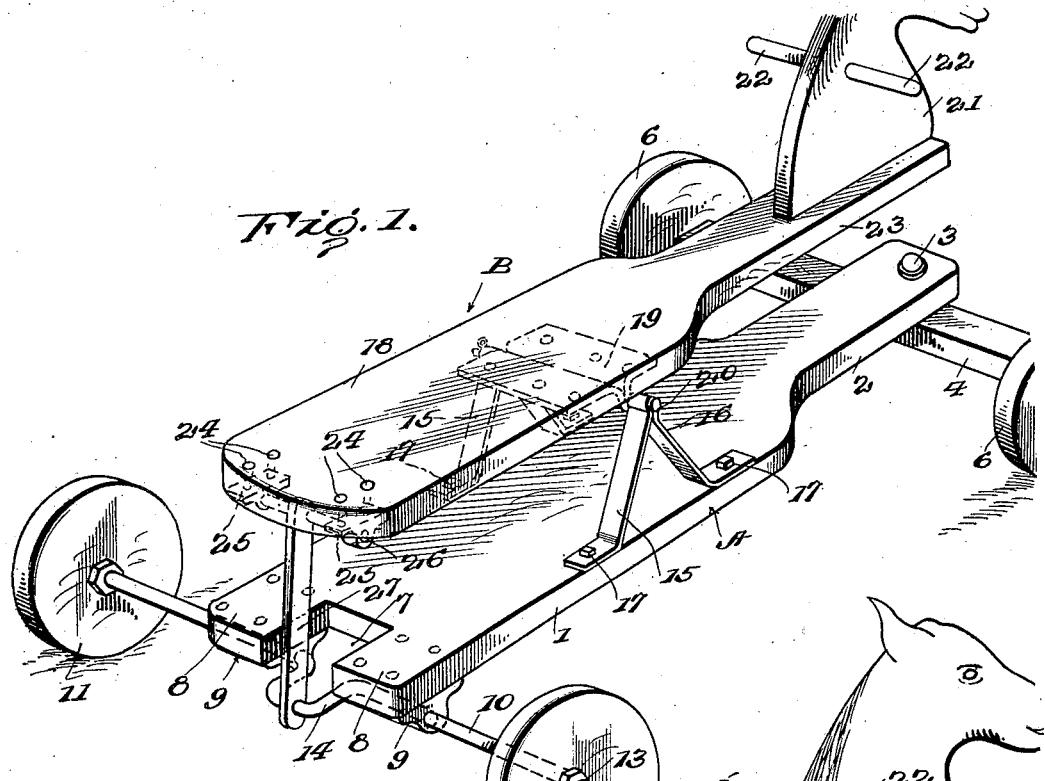
Figure 1 is a perspective view of a vehicle constructed according to the present invention.
Figure 2:
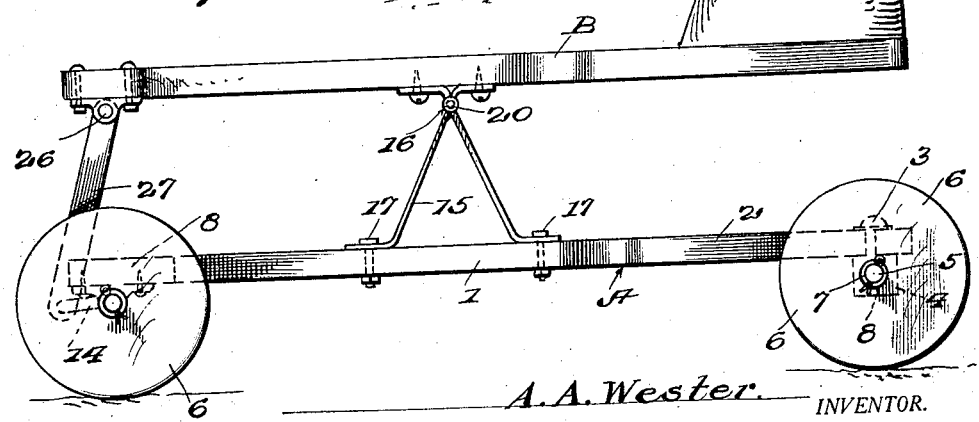
Fig. 2 is a side elevation of the vehicle shown in Fig. 1.

In detail:

A vehicle constructed according to the present invention comprises a running gear A and a passenger carrying body B.

The running gear A consists of a frame 1 having a narrow portion 2 at the forward end thereof which has pivotally secured thereto by a king bolt 3, the axle 4, the configuration of which is square in cross section or flat on the side adjacent the narrowed portion 2 so that there is no tendency of the axle to turn. The ends of the axle are round as shown at 5 and wheels 6 are secured thereto by means of washers 7 and cotter pins 8. With this construction a simple axle mounting is secured which, by reason of the flat face of the axle being adjacent the flat face of the underneath side of the narrowed portion 2 has no tendency to rotate and bend the king bolt 3 which forms the steering pivot of the axle.

At the rear end the frame 1 is centrally cut out as shown at 7 and on each portion 8 a bearing 9 is secured in position on the under face and receives an axle 10 carrying wheels 11 secured in place by nuts 12 and cotter pins 13 keying the wheels 11 and axle 10 for simultaneous rotation on propulsion of the vehicle. Centrally of the axle is a crank portion 14, the cheeks of which prevent movement of the axle 10 transversely of the vehicle.

Inverted Y-shaped brackets 15 having bearings 16 at their upper end are secured by bolts 17 to the frame member 1. These brackets 15 are so located that the bearings 16 lie in a vertical plane cutting the transverse center line of the running gear of the vehicle the reason for which will be hereinafter set forth. A passenger carrying body seat 18 is provided with a substantially centrally positioned bearing member 19 mounting a pivot 20 journaled in the bearings 16 of the inverted Y-shaped brackets 15. At the extreme forward end of the seat 18 is mounted a horse's head or other animal head 21 which may have handles 22 as shown, the forward end of said seat 18 being narrow as indicated at 23 to correspond proportionately with the narrowed portion 2 of the frame member 1. At the rear end the seat 18 carries bolts 24 mounting bearings 25 in which is carried a pin 26. The crank 14 of the axle 10 and the pin 26 are connected by a connecting rod 27 so that on propulsion of the vehicle an oscillatory movement is imparted to the body seat 18. By reason of the fact that the pivotal association of the running gear and body seat is at substantially the transverse center its great longitudinal stability is imparted to the vehicle as a whole.

In the operation of the vehicle, the passenger may sit at substantially the transverse center which is over the bearing 19 and propel himself along by swaying movements of the body, the feet being placed on the front axle for steering and the handles 22 being grasped. Due to the arrangement of the crank 14 and the connecting rod 27 in combination with the pin 26 carried by the body seat 18 such propulsion will impart oscillatory movement to the passenger carrying body B. The vehicle may also be used in coasting in which case the passenger places his feet on the axle 4 at each side of the king bolt 3 and moves the axle for steering. The speed of the vehicle may be controlled by moving to the rear of the pivot 20 thus disposing all of the weight on one side of such pivot and thereby retarding the progress of the vehicle.

In the event that the vehicle is used by two passengers they may use the body seat 18 as a teeter board for propelling the vehicle, one passenger being placed on each side of the pivot 20 and by teetering movements of the bodies of the passengers the vehicle will be propelled over the ground by reason of the crank 14 and the connecting rod 27 turning the axle 10 and the speed of the vehicle may be increased or diminished at the will of the passengers by one of such passengers moving to or from the pivot 20.

I claim:

In a toy vehicle, a running gear comprising a flat frame member having a reduced forward portion, a front axle provided with wheels, said axle being pivoted to the extreme forward end of the reduced portion whereby a short turning radius is secured, a rear axle carrying wheels and having a crank, the frame member being cut in from the rear end to permit movement of the crank of said axle, inverted Y-shaped brackets carried by said frame member intermediate the axles and on opposite sides of the frame member, a passenger carrying body member also having a reduced forward portion and co-extensive with the frame member, said body member carrying a centrally disposed bearing, an axle carried in said brackets and said bearing, bearings at the rear extremity of said body member and receiving an axle, and a connecting rod carried by said last-mentioned axle and connected with the crank of the rear axle.

In testimony whereof I affix my signature

ARTHUR A. WESTER. [L. S.]